United States Patent [19]

Hashimoto

[11] Patent Number: 5,117,395
[45] Date of Patent: May 26, 1992

[54] EXPANSIBLE FIFO MEMORY FOR ACCOMMODATING ADDED MEMORY STAGES IN A MULTISTAGE MEMORY WITH COMMON CONTROL SIGNALS

[75] Inventor: Masashi Hashimoto, Garland, Tex.

[73] Assignee: Texas Instruments Incorporated, Dallas, Tex.

[21] Appl. No.: 245,834

[22] Filed: Sep. 16, 1988

[30] Foreign Application Priority Data

Sep. 18, 1987 [JP] Japan ................. 62-234522

[51] Int. Cl.⁵ .................... G11C 19/00; G11C 8/00
[52] U.S. Cl. ..................... 365/221; 365/230.03
[58] Field of Search ............ 365/221, 230.03, 189.05, 365/239, 233

[56] References Cited

U.S. PATENT DOCUMENTS 4,562,435  12/1985  McDonough et al. .......... 340/799
4,799,198  1/1989  Ogawa .......................... 365/221

OTHER PUBLICATIONS

Tunick, "Rich with logic, Memory ICs Hone their Specialties", Electronic Design, Jun. 11, 1987, pp. 77–86.
Pai, FIFO RAM Controller Tackles Deep Data Buffering, Computer Design, Aug. 1, 1986, pp. 109–112.

Primary Examiner—Glenn Gossage
Attorney, Agent, or Firm—William E. Hiller; Richard L. Donaldson

[57] ABSTRACT

An expansible FIFO memory device to which additional memory stages having the same internal memory structure may be connected to form a multistage memory of increased memory storage capacity, uses a basic control circuit which is applicable to all of the added memory stages. The respective memory stages are connected in parallel such that only one memory stage is operable at one time instant in performing a data write or a data read operation. As a memory stage is completely filled with data written thereinto or conversely is completely emptied from the readout of data therefrom, the control circuit common to all of the memory stages provides appropriate signals indicative of the full condition of the memory stage in a data write operation and of the empty condition of the memory stage in a data read operation which signals are communicated to the next memory stage for activation thereof in a continuation of the data write or data read operation. Memory capacity of the expansible FIFO memory device may be thereby increased by adding memory stages thereto without complicating the control circuit and increasing the circuit components thereof.

5 Claims, 3 Drawing Sheets 5,117,395

EXPANSIBLE FIFO MEMORY FOR ACCOMMODATING ADDED MEMORY STAGES IN A MULTISTAGE MEMORY WITH COMMON CONTROL SIGNALS

BACKGROUND OF THE INVENTION

1. Field of the Invention

The present invention relates to semiconductor memory devices, and more particularly to an expansible FIFO (first in first out) semiconductor memory device to which additional memory stages having the same internal memory structure may be connected to form a multistage memory of increased memory storage capacity.

2. Description of the Prior Art

For large scale general-purpose computers, the amount of data to be processed has continued to increase through the years. From the viewpoint of access time, throughput and required memory capacity consistent with the ever-increasing volume of data to be processed, the use of an expanded memory storage device between a main memory storage device and a magnetic disk storage device has been a possibility. The function of the expanded memory storage device would be to fill the access time gap between the main memory storage device and the magnetic disk storage device, and also to provide a memory storage capacity larger than that of the main memory storage device, and capable of sequential access.

Heretofore, memories truly appropriate for such a purpose have not existed in the market. Consequently, DRAMS (dynamic random access memories) have been used for this purpose in the prior art. However, when the memory employed as an expanded memory storage device is a DRAM, device control is complicated and a control circuit for performing necessary control functions tends to have a large number of circuit components. The increase in the memory capacity provided by a DRAM when serving in the role of an expanded memory storage device is responsible for the change in the control circuit adding significantly to the complexity thereof, and thus the memory capacity can not be easily increased.

OBJECTS AND SUMMARY OF THE INVENTION

An object of the present invention is to provide a memory device enabling memory capacity to be increased by adding additional memory stages while holding down the overhead required for controlling the memory device, such that the memory device will be appropriate as an expanded memory storage device including a multiple number of memory stages without adding to the complexity of the control circuit for performing necessary control functions.

In semiconductor memory devices performing the FIFO operation, the invention relates to a semiconductor memory device suitable as an expanded memory storage device to which additional memory stages of like structure may be connected for increasing memory capacity while using a basic control circuit applicable to all added memory stages, wherein the control circuit in effecting data write control for the memory device with which it is associated comprises means for:

(a) activating a write operation in response to an external signal;
(b) incrementing a write address in response to an additional external signal;
(c) transmitting a signal which informs that the write address is at its maximum value to the outside (of the device), also performing the deactivation of the write operation and the reset of the write address to its initial value; and
(d) in response to a further additional external signal, performing the deactivation of the write operation and the reset of the write address to its initial value independently of its address location; and in effecting data read control comprises means for:

(e) activating a read operation in response to an external
(f) incrementing a read address in response to an additional external signal;
(g) transmitting a signal which informs that the read address is at its maximum value to the outside, also performing the deactivation of the read operation and the reset of the read address to its initial value; and
(h) in response to a further additional external signal, performing the deactivation of the read operation and the reset of the read address to its initial value independently of its address location.

Other objects, features and advantages of the invention will appear more fully from the following detailed description thereof taken in connection with the accompanying drawings.

DESCRIPTION OF THE PREFERRED EMBODIMENT

Figure 1:
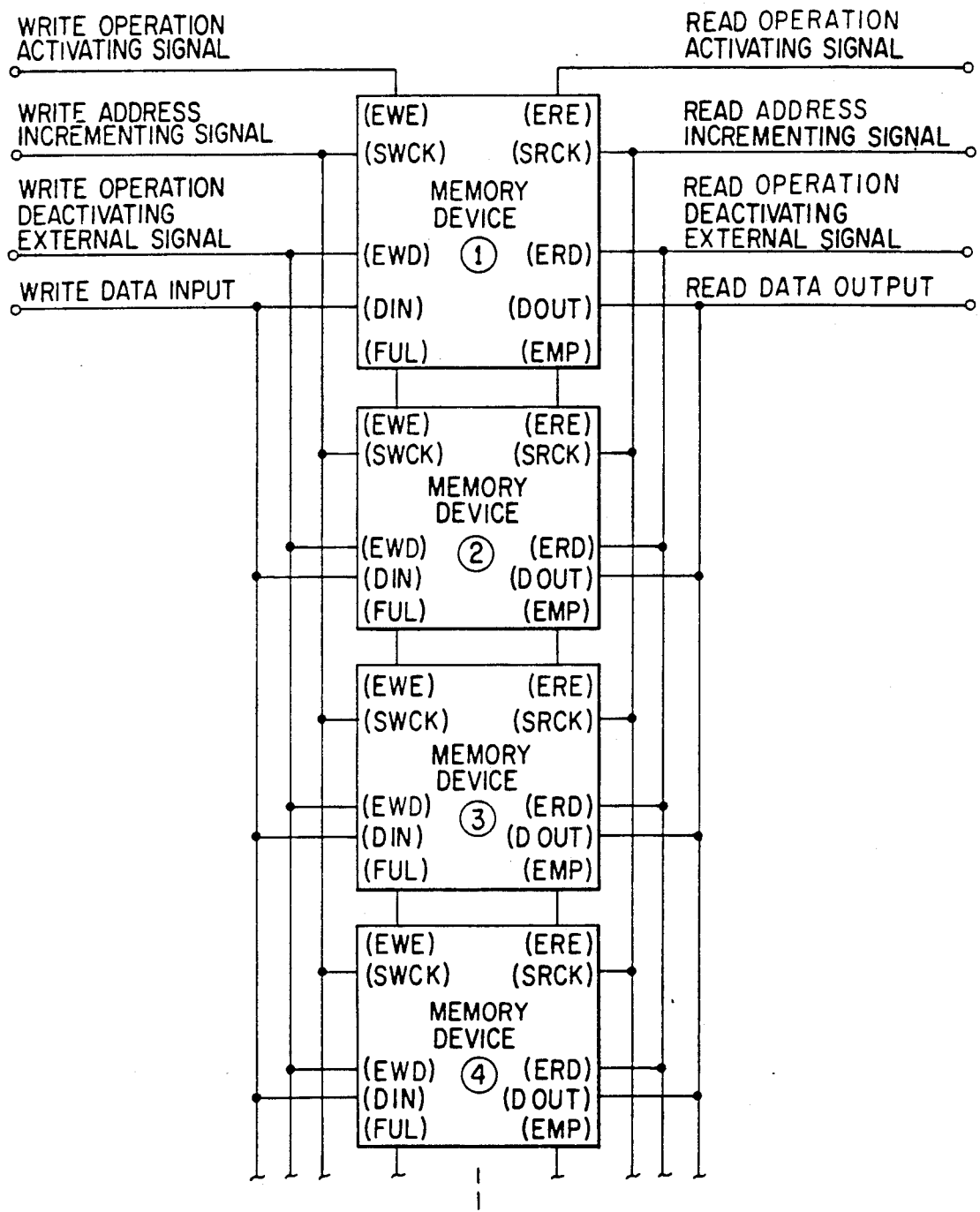
FIG. 1 is a block diagram of an expansible memory device in accordance with the present invention, wherein a plurality of memory devices of like structure are connected in the form of an expanded multistage memory.

FIG. 1 shows a block diagram of an expansible memory device according to the invention, wherein a plurality of memory devices of like structure are connected as respective memory stages in an expanded multistage memory.

Each of the terminals associated with the expansible memory device in FIG. 1 is identified as follows:

EWE . . . an input terminal for receiving external write operation activating signals in the activation of the data write function of the memory device itself;

SWCK . . . an input terminal for receiving external write address incrementing signals in incrementing a write address;

FUL . . . an output terminal for transmitting a signal which informs that the write address is at its maximum value (that data have been written in the whole memory space), deactivates further operation of the write function of the memory device, and resets the write address to its initial value, the address 0;

EWD ... an input terminal for receiving external write operation deactivating signals, and simultaneously performing the deactivation of the write operation and the reset of the write address to its initial value independently of its address location in response thereto;

ERE ... an input terminal for receiving external read operation activating signals in the activation of the read data function of the memory device;

SRCK ... an input terminal for receiving external read address incrementing signals in incrementing a read address;

EMP ... an output terminal for transmitting a signal which informs that the read address is at its maximum value (that all read data in the whole memory space have been read), deactivates further operation of the read function of the memory device, and resets the read address to its initial value, the address 0; and ERD ... an input terminal for receiving external read operation deactivating signals in simultaneously performing the deactivation of the read operation and the reset of the read address to its initial value independently of its address location in response thereto.

The write operation will now be described with respect to the expanded multistage memory device of FIG. 1 which includes memory devices 1, 2, 3 and 4 as connected memory stages.

Referring to FIG. 1, an operator applies a write operation activation signal which is input to the EWE terminal of the memory device 1 to activate the write function. Since the FUL signal of the memory device 1 is not generated until the memory capacity of the memory device 1 is full of the data written thereinto during a write operation, the condition of the write operation is retained in a deactivated status for the memory device 2. For the same reason, the condition of the write operation is retained in a deactivated status for memory devices 3 and 4 and any subsequent memory devices.

When the memory space of the memory device 1 has been filled with the data written thereinto, the write operation is deactivated for the memory device 1, and the FUL signal is transmitted by the memory device 1 to the EWE in the memory device 2, thereby providing a write operation activating signal to the memory device 2. Therefore, the subsequent data is written in the memory device 2.

With the repetition of such operations, the data are subsequently written in the memory devices 3 and 4, each of the memory devices 1, 2, 3 and 4 being connected in parallel with each other. An end of data writing is communicated to these memory devices 1-4 by the operator through the application of a write operation deactivating signal to EWD. In actuality, this write operation deactivating signal applies only to the single memory device in which the data writing function is in operation at the time for deactivating the write operation with respect to this single memory device. The other memory devices are already under a deactivated state with respect to the data writing operation.

As will be apparent from the above description, while the plurality of memory devices 1-4 are connected as respective memory stages in an expanded multistage memory, only one of the memory devices is to be operated at a time in a data writing operation, and thus the power dissipation as a whole is theoretically that of only one memory device. (In actuality, when a memory array such as a DRAM is used, the stand-by current flows.)

The read operation can be performed in a manner similar to that of the write operation. That is, the operator applies a read operation activating signal to the ERE of the memory device 1 to activate the readout function of the memory device 1. Since the readout functions of the memory devices 2, 3 and 4 are deactivated, the readout data output terminals Dout for these memory devices 2, 3 and 4 are under a high-impedance state, and there is no problem even with the wired OR connection as in FIG. 1.

After the completion of the readout of the last data remaining within the memory device 1, the EMP signal of the memory device 1 is generated to be transmitted to the ERE in the memory device 2, and the read operation is shifted to the memory device 2.

For deactivating the read operation, if the read deactivating signal is applied to ERD by the operator in a manner similar to the deactivation of the write operation by an operator-applied signal to EWD, then the read operation in the memory device where the read operation is being performed at that time is deactivated and the read operation with respect to the whole expanded memory system is also deactivated.

As will be apparent from the above description, the required external signals for the expanded multistage memory device number only 8 signals (i.e. EWE, SWCK, EWD, Din, ERE, SRCK, ERD, and Dout) regardless of the number of the memory devices included as memory stages. Therefore, theoretically, an increase in the complexity and the components of the control circuit is not required. (The memory devices are connected in parallel to each other, and thus the driving ability of the driver for driving the write address incrementing signal must be made larger.)

Figure 2:
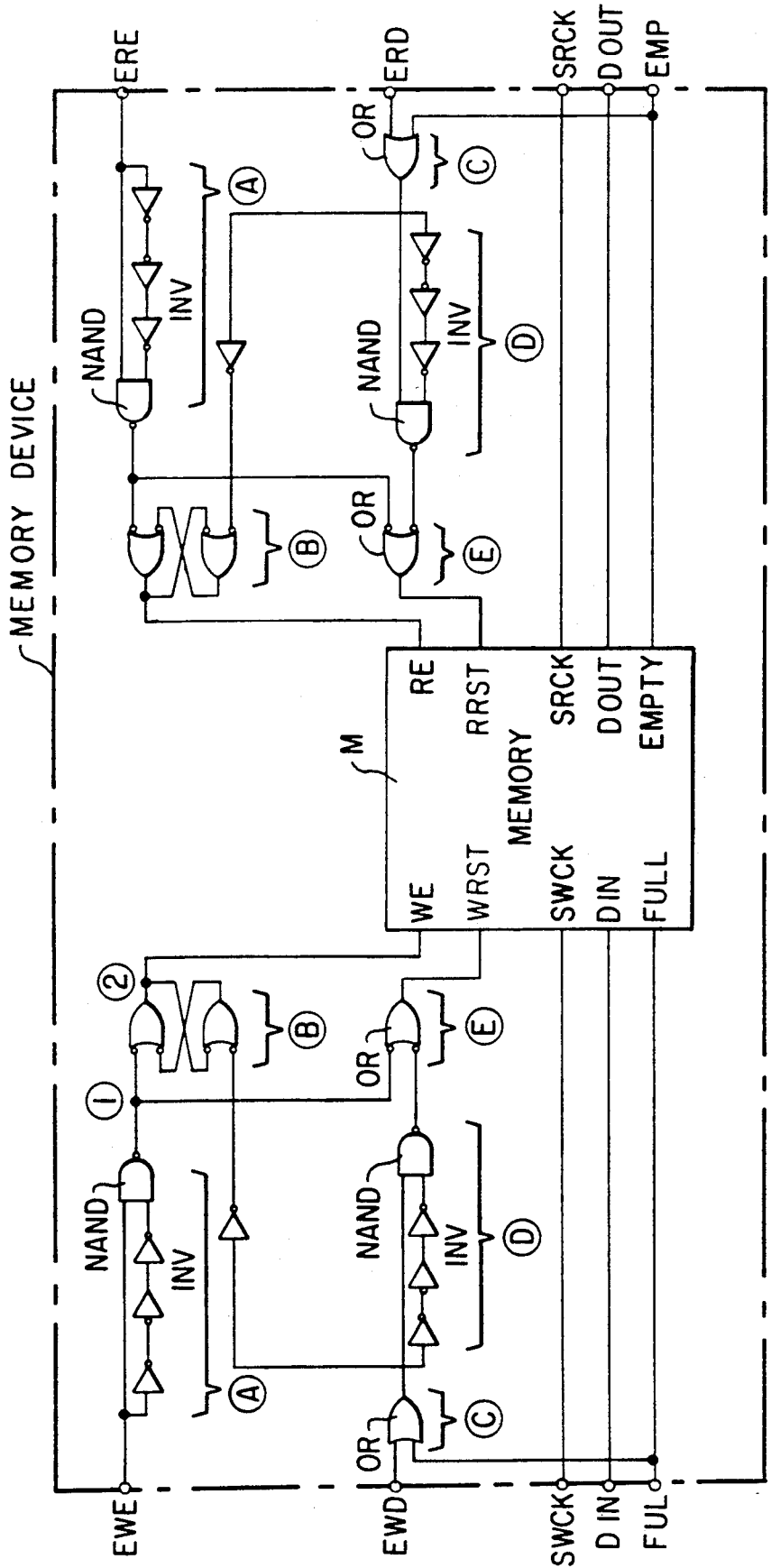
FIG. 2 is an illustrative circuit diagram of one stage of the expansible memory device of FIG. 1 and showing the components of the control circuit.

FIG. 2 shows one memory device of the expanded multistage memory device of FIG. 1, with the control circuit being shown in more detail. Briefly describing the write operation, the rising edge of EWE is detected to output a one-shot pulse (−|_|−) in the circuit A (three inverters INV and a NAND gate). The output of circuit A is transmitted to a node 1, and then input to an R-S type flip-flop B. The output is transmitted through a node 2 to a WE terminal of memory M to activate the write function. The output of circuit A is also input via node 1 to an OR gate E at the same time, to transmit a one-shot pulse (_|−|_) to a WRST terminal of memory M, also performing the reset of a write address. Therefore, the rising edge of an external signal which is input to the EWE, is detected to write data which is input from a Din to the memory device from the first write address.

As noted above, at the time when a Full terminal is set in the memory M, and when the write address has reached its maximum value, a "1" signal is output. This signal is output as an external output "FUL", and transmitted through the OR circuits C, D, and E to the WRST terminal of memory M to perform the reset of a write address. Since the read operation is similar to the write operation, the read operation will be understood from the previous description thereof in conjunction with FIG. 1 and from the description of the write operation in relation to its control circuit components as shown in FIG. 2.

As described above, the present memory device having the FIFO function is useful for expanding the storage capacity by simply adding more memory stages.

The control signals for the memory device number only 8 different signals, even though the control signals for both the read and write operations are included. As shown in FIG. 1, each memory stage has an output terminal "FUL" connected to the "EWE" input terminal of the next memory stage in series. Therefore, when a plurality of the memory devices are multistage-connected, for wiring on a circuit board as the control signal lines, four lines (SWCK, EWD, SRCK, and ERD) are sufficient for both the write and read operations. Thus, the packaging efficiency onto the circuit board surface is very high, and the complexity and number of control circuit components can be minimized. Since the individual memory devices are multistage-connected to perform subsequently the write and read operations, memory capacity can be readily increased by simply adding memory devices as extra memory stages, and to do this, it is not necessary to change the control lines.

The present memory device, as described above, may be used not only as a means of providing an expanded storage capacity in a large sized general-purpose computer, but also as an interface with the data-base of an engineering work station, business computer, personal computer, etc.

In addition, the memory device in accordance with the present invention has application as a buffer memory for the input and output ports of a data processor for sequential data.

Figure 3:
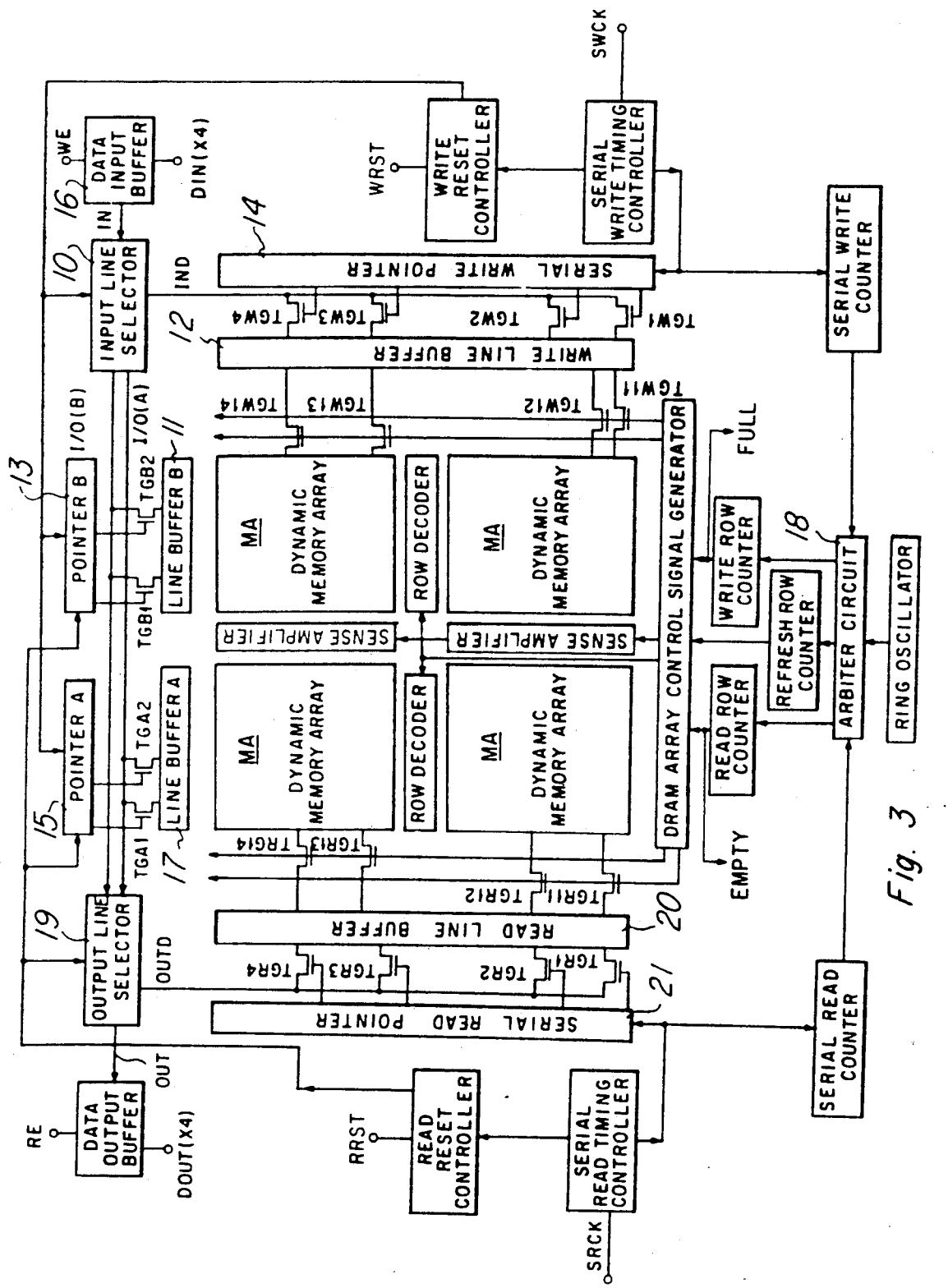
FIG. 3 is a schematic block diagram of an entire FIFO memory device in which the control circuit illustrated in FIG. 2 may be implemented so as to provide an expanded multistage memory.

The memory M shown in FIG. 2 may take the form of a FIFO memory having the architecture shown in FIG. 3.

The FIFO memory of FIG. 3 has terminals WE, WRST, SWCK, Din, Full, RE, RRST, SRCK, Dout, and Empty, each as shown in FIG. 2, in peripheral circuit parts. Then, when the write address and read address have reached their maximum values, the terminals Full and Empty which respectively output the signals indicative of full and empty status with respect to the storage capacity of the memory can be easily realized by detecting a logic output of the respective built-in read and write row counters. Thus this detecting circuit is not shown, and only the outputs are shown as "FUL" (for informing that the write address has reached its maximum value), and "EMP" (for informing that the read address has reached its maximum value).

The operation of the FIFO memory of FIG. 3 will now be described. The write operation and read operation for data are usually performed independently of each other and at different time intervals in the present memory device. Thus, in the following description, it will be assumed that both the write and read operations are being performed separately during respective different time intervals unless otherwise described.

In FIG. 3, the WE terminal provides an external input signal for controlling data to be written, and as long as the WE signal is at the high level "H", data input from the terminal Din is written to the memory device as effective data. The Din is an input terminal for inputting data. The WRST terminal provides a write reset signal as indicating at the rising edge thereof, a return to the first write data address. SWCK is a clock signal for controlling the timing of the data write cycle.

The RE terminal provides an external input signal for controlling the readout of data, and as long as the RE signal is "H" (at the "high" level), data is read out from the data output terminal Dout synchronously with the serial read clock signal SPCK.

The RRST terminal provides a read reset signal as an input signal for indicating at the rising edge thereof, a return to the first read data address.

Data Write Operation (1) The WRST input signal is first changed from the low level "L" to the high level "H", to set a data write address within the memory device at the starting address 0. Within the memory device, a series of operations is performed as follows. The rising edge of the WRST signal is detected by a proper circuit, to indicate the occurrence of the reset of the data write address to the initial address 0 to an input line selector 10. The input line selector 10 upon receiving the WRST signal establishes an electrical connection of a line I/O (A) to a line IN. A line I/O (B) and a line IND are electrically disconnected from the line IN. At the same time, data transfer gates $T_{GB1}$ and $T_{GB2}$ of the line buffer B 11 which are connected to the line I/O (B), and data transfer gates $T_{GW1}$-$T_{GW4}$ of write line buffer 12 which are connected to the line IND, are all turned off. That is, a pointer B 13 and a serial write pointer 14 are under a reset state, while a pointer A 15 indicates the address 0. The data transfer gate $T_{GA1}$ is now turned on. Thereby, data from a data input buffer 16 is transmitted along the lines IN and I/O (A) and written at the address 0 of line buffer A 17.

(2) Synchronously with the clock SWCK, the data is sequentially written at successive addresses of line buffer A 17.

(3) After the data has been written at all addresses of line buffer A 17, a data transmission route switching request for switching the data transmission path is transmitted from the pointer A 15 to the input line selector 10, and the input line selector 10 disconnects the line I/O (A) from the line IN and connects the line IND to the line IN.

(4) Synchronously with the clock SWCK, the serial write pointer 14 sequentially turns on the data transfer gates $T_{GW1}$-$T_{GW4}$ of write line buffer 12 to write input data from the $D_{IN}$ in the write line buffer 12.

(5) At the same time when the serial write pointer 14 turns on the data transfer gate $T_{GW3}$, a write request signal WRQ is generated and transmitted to an arbiter circuit 18 for writing data stored in the first half of write line buffer 12, in the dynamic memory array MA.

(6) Subsequently, by increasing the address of a row decoder one by one, the write operation for data can be sequentially continued to write data up to the maximum DRAM capacity.

If another reset request signal WRST is generated while data is being written in the DRAM, it is similarly transmitted to the input line selector 10. This time, however, the line I/O (B) is connected to the line IN, and the lines I/O (A) and IND are disconnected from the line IN. After data has been written in all addresses of line buffer B 11, an operation similar to the step (3), disconnects the line I/O (B) from the line IN, reconnects the line IND to the line IN, and so on; data write operation then similarly proceeds.

Upon input of the next reset request signal WRST, the line I/O (A) is connected to the line IN. That is, the two lines I/O (A) and I/O (B) are alternately selected for connection to the line IN in the nature of a toggle switch.

The line buffer A 17 and line buffer B 11 both may be complete static type memory devices. The reason for such an architecture is deeply related to the data read operation, and will be discussed in the description of the data read operation.

Data Read Operation (1) The read reset input signal RRST is changed from low "L" to high "H" to set a data read address within the memory device at the starting address 0. Within the memory device, the rising edge of signal RRST is detected to indicate the occurrence of the reset of the data read address to the initial address 0 to an output line selector 19 and to the arbiter circuit 18. The output line selector 19 upon receiving the RRST signal, connects either the line I/O (A) or the line I/O (B) to the line OUT. If a data write operation is being performed through one of the lines I/O (A) or I/O (B) at this time, the output line selector 19 connects the other line which is not being used for the data write operation to the line OUT. This means, when the signal WRST is followed by a signal RRST within a predetermined time, the assurance of the readout of old data. This arrangement is intended to provide for data which is stored in the main memory of dynamic type to be consistently readout, and will be described later. If neither the line I/O (A) nor I/O (B) is connected to the line IN, one of these two lines that has been used by the last WRST signal generated prior to the RRST signal, is connected to the line OUT. In this case, new data is to be read. Thereafter, each time the signal RRST appears, the same data will be repeatedly readout until the next WRST signal is generated. Since the RRST signal is an external signal input from the outside by the operator, the generation of the RRST cannot be forecasted. For quick response to the RRST signal, the static type memory which is capable of high-speed readout, is suitable. For this reason, the static type memory is preferred for line buffers A 17 and B 11 in this embodiment. Although the circuit integration density is decreased with the use of the static type memory, a memory capacity of about 100 bits for each of the line buffer A 17 and line buffer B 11 is sufficient, and thus, the influence on the total memory device size caused by the use of static type memories for the line buffers A 17 and B 11 is negligible.

The RRST signal as it is transmitted to the arbiter circuit 18, generates a read request signal RRQ for reading data which is written in the dynamic memory array MA into a read line buffer 20, so that necessary data may be readout during a necessary time period. This is to prepare for the sequential data readout after the readout of all data from a line buffer A 17 or line buffer B 11 that is currently being read.

(2) Synchronously with the clock SRCK, data is serially read out from the line buffer A 17 or B 11 until the data at the last address of line buffer A 17 or B 11 has been read.

(3) A data transmission route switch request is then transmitted from the pointer A 15 or B 13 to the output line selector 19 to connect the line OUT to the line OUTD.

(4) Since at the step (1), the first half of the read line buffer 20 has already been loaded with data to be readout, data is now continuously readout through the line OUT without interruption. At the same time when a read pointer 21 turns on the data transfer gate $T_{GR1}$, another read request signal RRQ is generated and applied to the arbiter circuit 18 to read necessary data from the dynamic memory array MA to the second half of the read line buffer 20.

By inputting the RRST signal repeatedly, the same series of data can be readout repeatedly.

This describes the basic operation of the FIFO memory illustrated in FIG. 3.

If the memory is an ideal FIFO memory, data write and read could have been completely asynchronously performed, but in actuality, because of the memory capacity limit of the memory device, some restrictions are imposed with respect to the data write and read operations.

For easier understanding, an explanation will be given with reference to an application of the FIFO memory device where a video signal is read and written as video data. It is assumed that the memory capacity of the FIFO memory corresponds to one frame of the video screen image (according to the NTSC system which is standard in Japan, one frame of the video screen image is composed of 525 scanning lines. Thus the total video data of the 525 scanning lines is one frame of video data).

As a frame of video data is sequentially written into the memory device from the starting video data to the last video data of the frame, the memory device becomes full. When the memory device is full of video data, if the video data is further written continuously (that is, video data continues to be written even after the first frame is switched to the second frame), then, the data stored in the memory is successively replaced with data of the second frame. Of course, if the WE signal is set to "Low" to prohibit the data write operation of the second and subsequent frames, then the data in the first frame is kept stored, and the same data can be repeatedly readout by repeating the data read procedure.

The operation of the memory architecture shown in FIG. 3 is as described above. However, some modifications can be very easily realized, such as the generation of an internal signal when the memory is full so as to inform the operator of the full condition, and the prohibiting of the data overwrite status by creating the same internal state within the memory as if the WE signal were set at the "Low" level.

With the memory architecture in FIG. 3, as described above, when data is written continuously, either the preceding frame (old data) or the current frame (new data) that is being written can be read, depending on the readout timing in effect with respect to the timing of the RRST signal relative to the last WRST signal. The timing interval is determined in accordance with the memory capacity of the line buffer A 17 and the line buffer B 11. If the line buffer A 17 has a memory capacity of 100 bits, for example, and if the RRST signal is generated within 100 SWCK clock cycles after the generation of the last WRST signal, then the readout in this case, is the readout of old data.

For the readout of new data, when the RRST signal is generated more than 100 SWCK clock cycles after the generation of the last WRST signal, the readout of new data is not always ensured. In this case, it depends on the data transfer time in the main memory MA from the write line buffer 12 to the memory array and from the memory array to the read line buffer 20.

In detail, assuming that the read line buffer 20 and the write line buffer 12 both have a memory capacity of 200 bits, new data readout will occur under the following condition.

First, it is assumed that the first 100 bits of data of a new data frame, are written in the line buffer A 17, and the data from the 101th bit to the 200th bit are written in the write line buffer 12 at address 1 through 100. At the time when the 201th bit is written at the address 101 of the write line buffer 12, a write request signal is generated as previously described. Since the data transfer to the memory array has been completed at least before the 301th bit is written, new data will be read if a read request signal RRQ for requesting transfer of the data from the 101th bit through the 200th bit from the memory array to the read line buffer 20, is generated when the 301th bit is written or later resulting in the input of an RRST signal as previously mentioned.

In short, new data readout can be assured when an RRST signal is generated more than 300 SWCK clock cycles (that is, after 300 bits of data have been written) after generation of the last WRST signal.

In the case where an RRST signal is generated in the range of 100 to 300 SWCK clock cycles after the generation of the last WRST signal, the readout of new or old data can not be determined, and thus, the operator should not generate an RRST signal within this time range.

Since the data read and write operations can be asynchronously performed, the width of the SWCK and SRCK clock pulses may be freely changed.

What is claimed is:

1. An expansible memory device capable of FIFO data operation, said memory device comprising:

memory storage means having a plurality of memory cells for receiving data bits therein;

means operably connected to said memory storage means for enabling a data write operation in response to an external data write-operation activating signal;

data input means connected to said memory storage means for selectively providing input data as write data to said memory storage means in dependence upon the occurrence of said data write-operation activating signal;

means operably connected to said memory storage means for incrementing a write address in response to an external write data clocking signal to accommodate respective bits of input data in sequential memory cells of said memory storage means;

means operably connected to said memory storage means for transmitting a "memory full" signal externally of said memory storage means in response to the incrementation of said write address within said memory storage means to its maximum value indicative of bits of input data being written into all of said plurality of memory cells of said memory storage means;

said data write operation being deactivated and said write address being reset to a starting write address in response to the occurrence of the "memory full" signal;

means operably connected to said memory storage means for enabling a data read operation in response to an external data read-operation activating signal;

data output means connected to said memory storage means for selectively providing output data as readout data from said memory storage means in dependence upon the occurrence of said data read-operation activating signal;

means operably connected to said memory storage means for incrementing a read address in response to an external read data clocking signal for reading out respective bits of output data from sequential memory cells of said memory storage means;

means operably connected to said memory storage means for transmitting a "memory empty" signal externally of said memory storage means in response to the incrementation of said read address within said memory storage means to its maximum value indicative of the readout of bits of output data from all of said plurality of memory cells of said memory storage means; and said data read operation being deactivated and said read address being reset to a starting read address in response to the occurrence of the "memory empty" signal.

2. An expansible memory device as set forth in claim 1, further including means operably connected to said memory storage means for providing an external data write deactivation signal and the reset of said write address independently of its address location to the starting write address; and means operably connected to said memory storage means for providing an external data read deactivation signal and the reset of said read address independently of its address location to the starting read address.

3. An expansible memory device as set forth in claim 2, wherein said memory storage means further includes a first write operation input terminal for receiving the external data write-operation activating signal;

a second write operation input terminal for receiving the external write data clocking signal in the incrementation of the write address;

a write operation output terminal for transmitting the "memory full" signal externally of said memory storage means in response to the incrementation of said write address within said memory storage means to its maximum value;

a first read operation input terminal for receiving the external data read-operation activating signal;

a second read operation input terminal for receiving the external read data clocking signal in the incrementation of the read address; and a read operation output terminal for transmitting the "memory empty" signal externally of said memory storage means in response to the incrementation of said read address within said memory storage means to its maximum value.

4. An expansible memory device as set forth in claim 3, further including a plurality of said memory storage means as a plurality of memory stages with respective memory stages being connected in parallel;

said data input means and said data output means being respectively commonly connected to each of said plurality of memory stages;

each of said plurality of memory stages having respective first and second write operation input terminals, a write operation output terminal, first and second read operation input terminals, and a read operation output terminal;

said second write operation input terminals, and said second read operation input terminals of said plurality of memory stages being commonly connected in parallel;

the write operation output terminals and the read operation output terminals of successive memory stages being respectively connected to said first write operation input terminal and said first read operation input terminal of the next adjacent memory stage; and the next adjacent memory stage in said plurality of memory stages being respectively enabled for a data write operation in response to the "memory full" signal transmitted from the write operation output terminal of the previous memory stage to said first write operation input terminal of the next adjacent memory stage. and being enabled for a data read operation in response to the "memory empty" signal transmitted from the read operation output terminal of the previous memory stage to said first read operation input terminal of the next adjacent memory stage.

5. A method of operation an expanded memory device having a plurality of memory stages connected in parallel. said method comprising. for a write operation;

activating a data write operation in a first memory stage in response to an external data write operation activating signal;

selectively providing input data as write data to said first memory stage in dependence upon the occurrence of said data write operation activating signal;

incrementing a write address in response to an external write data clocking signal to accommodate respective bits of input data in sequential memory cells of said first memory stage;

sequentially storing respective input data bits as write data bits in memory cells of said first memory stage at successively incremented write addresses thereof;

transmitting a "memory full" signal from said first memory stage in response to the incrementation of said write address within said first memory stage to its maximum value indicative of bits of input data being written into all of said memory cells of said first memory stage;

deactivating the data write operation and resetting the write address to a starting write address in said first memory stage in response to the occurrence of the "memory full" signal;

applying the "memory full" signal transmitted from the first memory stage as a data write operation activating signal to a second memory stage;

repeating the data write operation sequence for each of the memory stages included in the expanded memory device. as necessary in a cascading operation such that only one of the plurality of memory stages is enabled for a data write operation at a given time instant;

and, for a read operation, activating a data read operation in a first memory stage in response to an external data read operation activating signal;

providing read data as output data from said first memory stage in dependence upon the occurrence of said data read operation activating signal;

incrementing a read address in said first memory stage in response to an external read data clocking signal;

sequentially outputting respective bits of read data from sequential memory cells of said first memory stage at successively incremented read addresses thereof;

transmitting a "memory empty" signal from said first memory stage in response to the incrementation of said read address within said first memory stage to its maximum value indicative of bits of read data being output from all of the memory cells of said first memory stage;

deactivating the data read operation and resetting the read address to a starting read address in said first memory stage response to the occurrence of the "memory empty" signal;

applying the "memory empty" signal transmitted from the first memory stage as a data read operation activating signal to said second memory stage; and repeating the data read operation sequence for each of the memory stages included in the expanded memory device, as necessary, in a cascading operation such that only one of the plurality of memory stages is enabled for a data read operation at a given time instant.

* * * * *